(12) United States Patent  (10) Patent No.: US 7,833,418 B1
Warren  (45) Date of Patent: Nov. 16, 2010

(54) MECHANICAL/BIOLOGICAL FILTER FOR A FILTRATION SYSTEM

(76) Inventor: Rick C. Warren, 5739 Frost La., Delray Beach, FL (US) 33484

( * ) Notice: Subject to any disclaimer, the term of this patent is extended or adjusted under 35 U.S.C. 154(b) by 90 days.

(21) Appl. No.: 12/249,387

(22) Filed: Oct. 10, 2008

Related U.S. Application Data

(60) Provisional application No. 60/979,248, filed on Oct. 11, 2007.

(51) Int. Cl.
*C02F 3/06* (2006.01)
*A01K 63/04* (2006.01)

(52) U.S. Cl. .................. 210/617; 210/631; 210/151; 210/167.22; 210/170.02; 119/260

(58) Field of Classification Search .......... 210/615, 210/617, 631, 150, 151, 167.22, 170.02; 119/260
See application file for complete search history.

(56) References Cited

U.S. PATENT DOCUMENTS

| | | | | |
|---|---|---|---|---|
| 4,009,105 A | * | 2/1977 | Jeris ........................... | 210/151 |
| 4,077,877 A | * | 3/1978 | Orensten et al. ............ | 210/615 |
| 4,708,792 A | * | 11/1987 | Takarabe et al. ............ | 210/150 |
| 4,833,083 A | * | 5/1989 | Saxena ........................ | 210/617 |
| 5,242,582 A | * | 9/1993 | Marioni ....................... | 210/151 |
| 5,288,400 A | * | 2/1994 | Phillips ....................... | 210/151 |
| 5,516,687 A | * | 5/1996 | Perez et al. .................. | 210/617 |
| 6,602,407 B2 | * | 8/2003 | Talbot et al. ................ | 210/150 |
| 7,252,766 B2 | * | 8/2007 | Stuth et al. .................. | 210/150 |
| 7,425,274 B1 | * | 9/2008 | Helfet ......................... | 210/151 |
| 7,488,417 B2 | * | 2/2009 | Chauquet et al. ........ | 210/167.22 |
| 2003/0159989 A1 | * | 8/2003 | Davis et al. ................. | 210/617 |
| 2007/0138075 A1 | * | 6/2007 | Chang ................... | 210/167.22 |

* cited by examiner

*Primary Examiner*—Christopher Upton
(74) *Attorney, Agent, or Firm*—Daniel S. Polley, P.A.

(57) ABSTRACT

A mechanical and biological filter system where in use water entering into a housing first contacts the mechanical filter covering access to the biological filter. As the water travels through the mechanical filter before reaching the biological filter, the water has been processed and cleaned by the mechanical filter, preventing the mechanically filtered elements from being disposed on the biological filters, to improve the reliability of the biological filter. The filtering of the water first through the mechanical filter provides for maximum use of the surface area of the biological filter for their intended purposes of fostering beneficial bacteria growth. The two stages of filtered water ultimately exits out of the housing through a housing outlet.

8 Claims, 8 Drawing Sheets

MECHANICAL/BIOLOGICAL FILTER FOR A FILTRATION SYSTEM

This application claims the benefit of and priority to U.S. Application Ser. No. 60/979,248, filed Oct. 11, 2007, which application is incorporated by reference in its entirety.

FIELD OF THE INVENTION

The present invention relates generally to filtration systems and more particularly to a mechanical/biological filter for the filtration system of a homeowner's pond and for similar water structures.

BACKGROUND OF THE INVENTION

Pressurized bead filters are commonly used with filtration systems for homeowner ponds. However, one flaw in the filter concept of all bead filters are that they are designed to biologically filter water but not mechanically clean the water. Accordingly, the filter must be backwashed to remove dirt that clogs the intake in the bead filter. Due to dirt collection, the filter becomes less and less effective, which results in the need for a larger tank to hold more dirt and hold more beads.

SUMMARY OF THE INVENTION

The present invention generally provides a mechanical and biological filter system having a housing where a biological and mechanical filter is preferably disposed within. The filter preferably comprises a center core defining an internal area where the biological fitter components are disposed. The mechanical filtering component is preferably externally disposed around the center core. In the preferred embodiment, the center core with the filter components are disposed within a housing which is provided within a pump system for a pond or other body of water.

In the preferred embodiment, the biological filtering component can be biological beads or balls, though other biological filters can be used and are also considered within the scope of the invention. The housing can have a bottom portion where the water inlet and outlets are preferably located. A drain assembly can also be provided within the bottom portion. The inlet serves as the inlet for the unfiltered water from a pond or other fluid system or fluid area, while the outlet serves as the outlet for the fluid or water after it has been filtered in accordance with the present invention.

The housing defines an internal water entry area that surrounds the center core. The biological filtering component is internal disposed within the center core. The housing inlet is in communication with internal water entry area, while the housing outlet is in communication with the internal area of center portion/center core through a water passageway or tunnel disposed at the bottom of the housing.

In use, water entering into the housing enters into the internal water entry area through the housing inlet and is forced through the mechanical filtering component disposed around the center core. Once traveling through the mechanical filtering component the water enters the internal area of the center core through one or more openings in the core where it contacts the biological filtering components. The filtered watered then exits the center core through the opening in communication with the housing outlet through the water passageway. Once through the housing outlet the water can be redirected to back to the pond or other water structure or portion associated with the filter system. The housing can also include a top portion which is properly sealed to a bottom portion and which can be opened to permit access within the housing. The mechanical filter can be a padding preferably disposed around a top portion of the center core and covering the apertures in the core.

In use for conditioning and filtering the water, water entering into the housing from the housing inlet first contacts the mechanical filtering pad. As the padding preferably covers all of the core apertures, the water must travel through the pad in order to enter the internal area of the core. Thus, before contacting the biological filters, the water has been processed and cleaned through the mechanical filter, which can remove allergy and other contaminants, such that the filtered elements do not enter the core's internal area with the water and thus are not disposed onto the biological filters. As the biological balls or beads do not get contaminated with these filtered elements, their reliability as a biological filter is maintained for an extended period time, if not an indefinite period of time. Additionally, the biological elements do not need to be cleaned as frequently, if ever, as compared to conventional filtering systems. The filtering of the water first through the mechanical filter provides for maximum use of the surface area of the biological balls for their intended purposes of fostering beneficial bacteria growth. The two stages of filtered (mechanical and then biological) water ultimately exits out of the housing through the housing outlet.

The present invention provides a filtering system which provides the benefits of mechanical and biological filtering components into a single filtering system and such that the mechanical filter is contacted first by the entered water to filter out various types of particles from the water before the water contacts the biological filter.

DETAILED DESCRIPTION OF THE INVENTION

Figure 1:
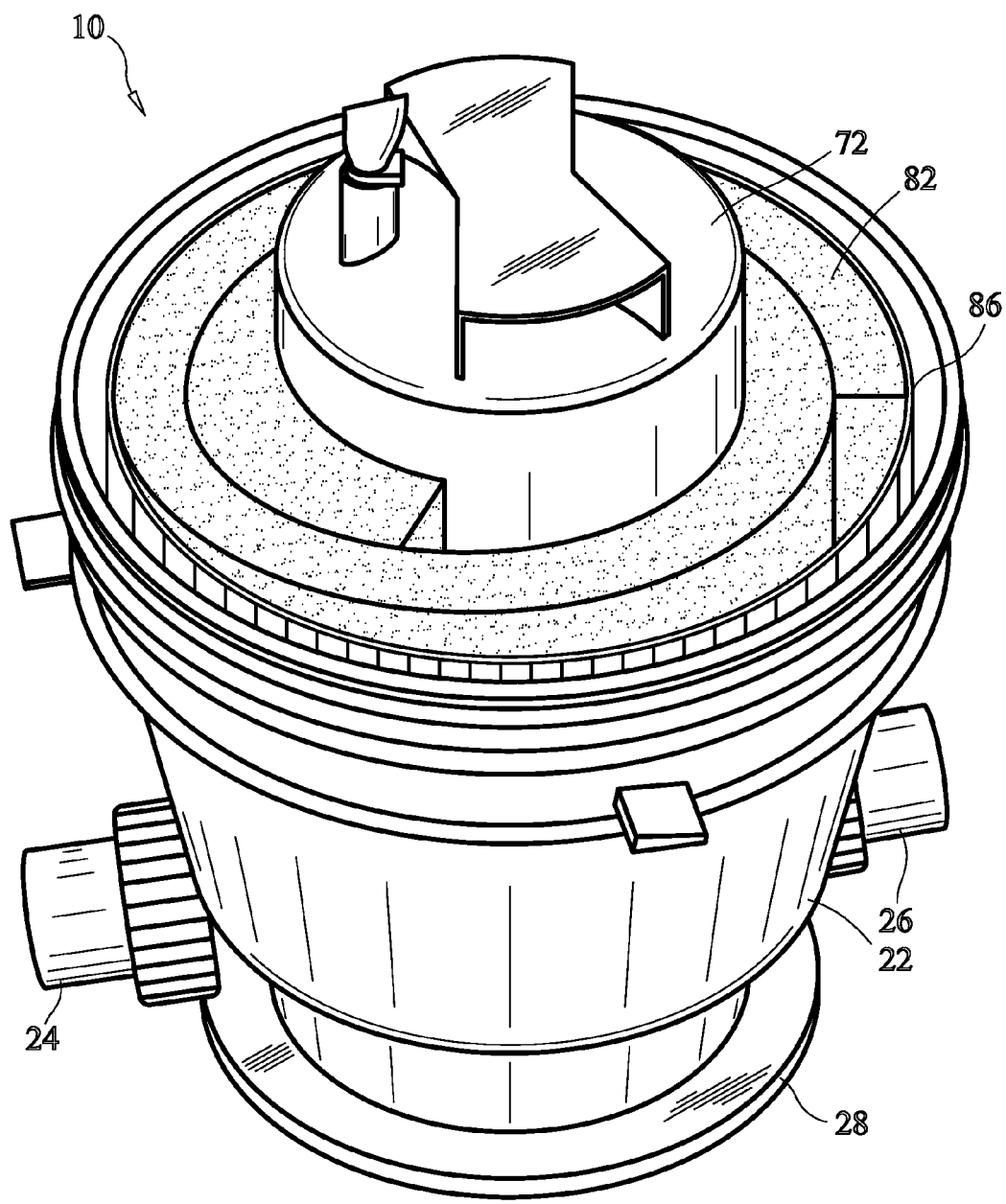
FIG. 1 is a perspective view of the mechanical/biological filter in accordance with the present invention having the housing cap or cover removed.
Figure 2:
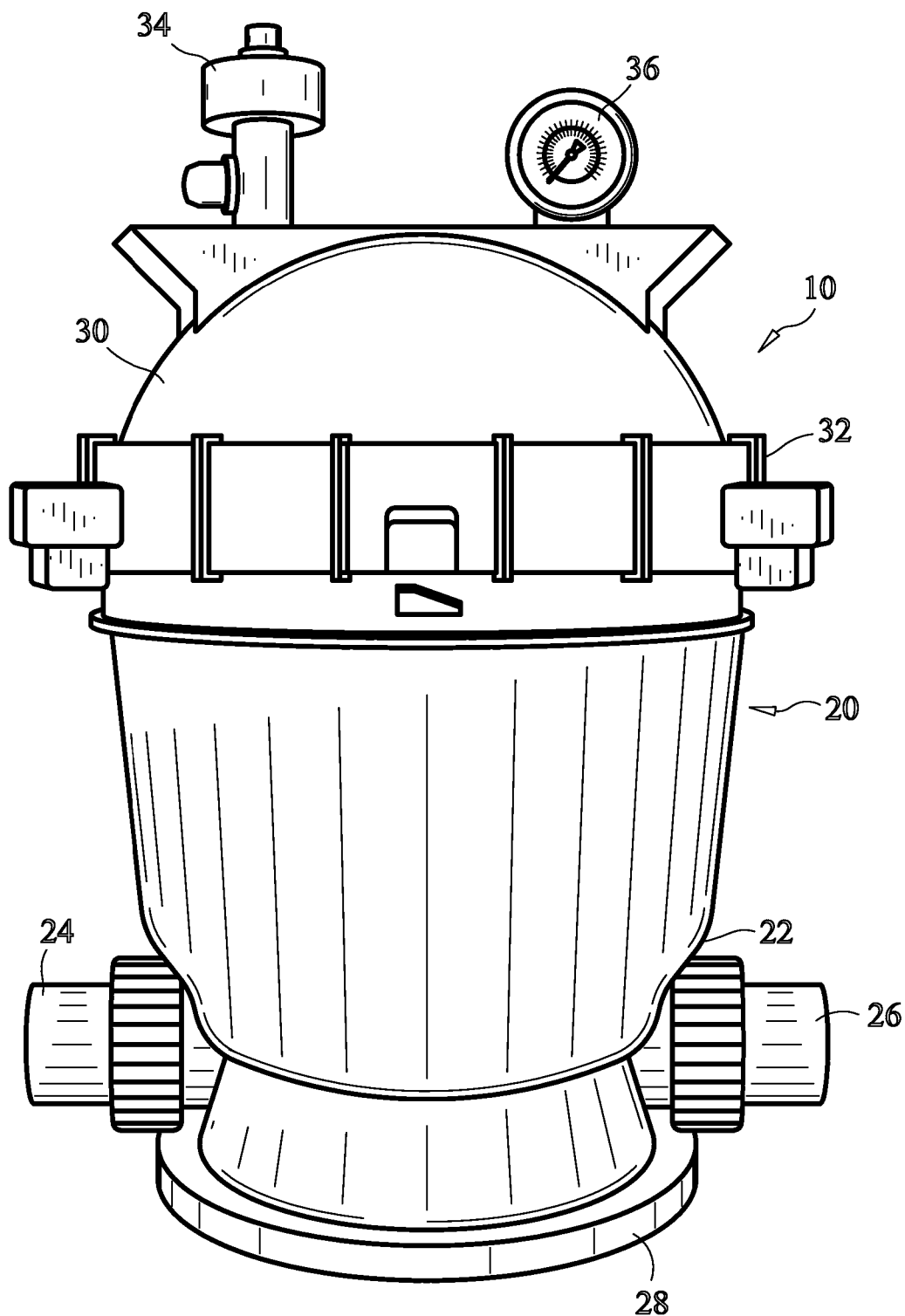
FIG. 2 is a perspective view of the filter of filter of FIG. 1 with housing cap or cover secured in place with respect to the filter housing.
Figure 3:
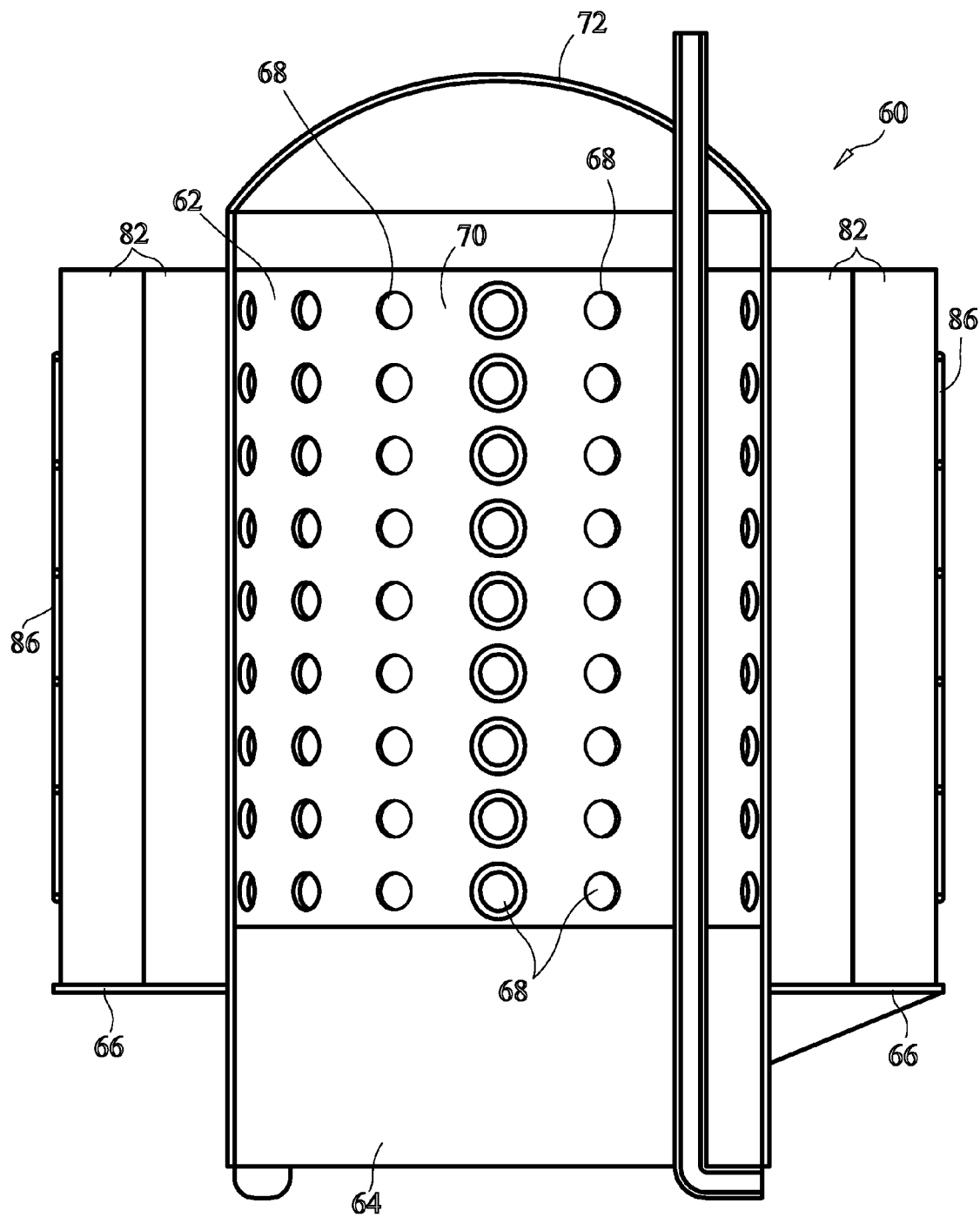
FIG. 3 is a front view of the filter core with the mechanical filtering component secured to the filter core in accordance with the present invention filter of FIG. 1.

As seen in the Figures, the present invention provides a mechanical and biological filter system which is generally designated as filter system 10. System 10 includes a housing 20 which houses a biological and mechanical filter 50. (See FIG. 1). Filter 50 generally consists of a center core 60 having biological filter components disposed within the center core and having a mechanical filtering component or padding 80 preferably disposed around the center core member 60.

Figure 4:
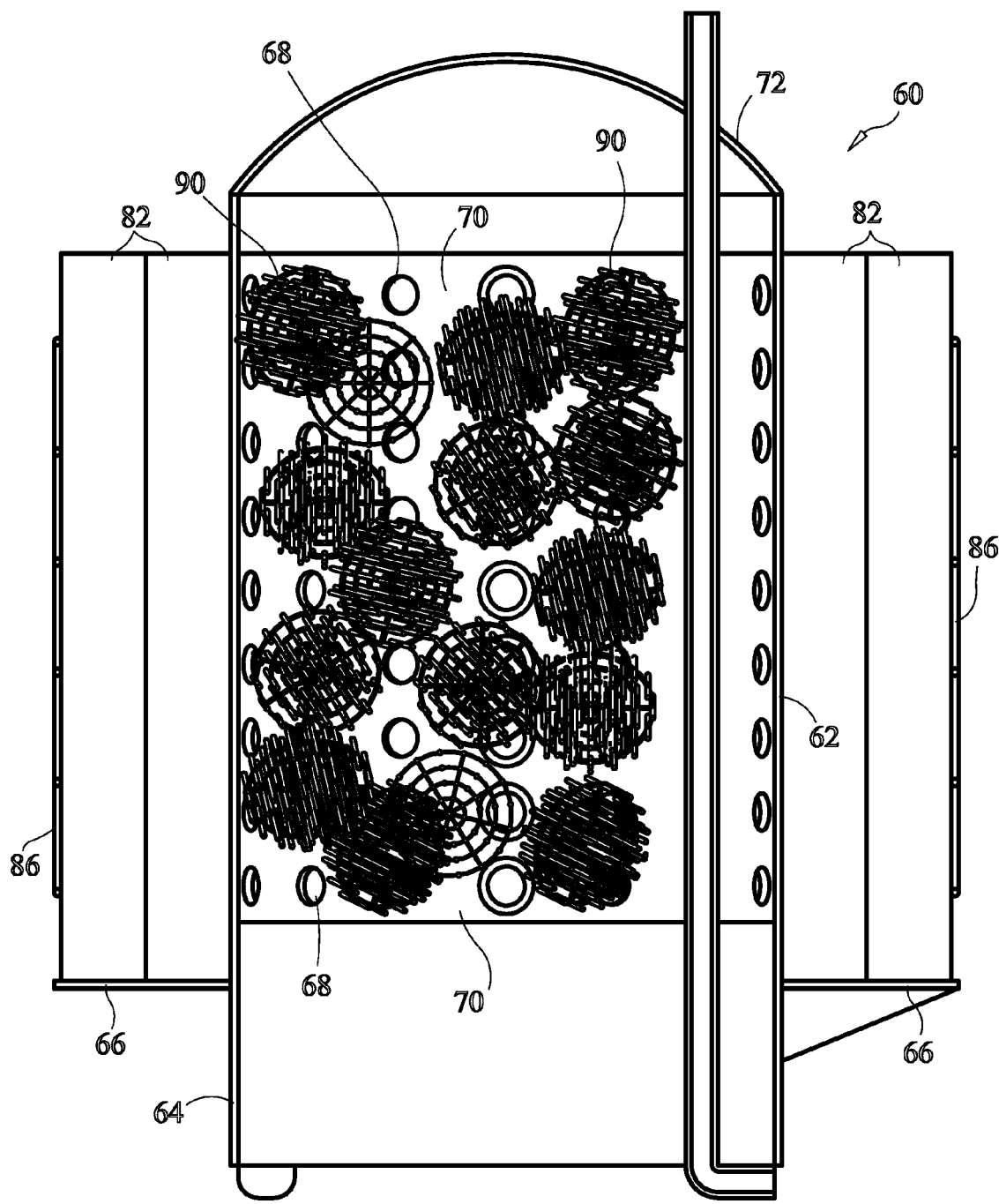
FIG. 4 is a front sectional view of the filter core with the mechanical filtering component secured to the filter core and the biological filtering component disposed within the center of the filter core in accordance with the present invention filter of FIG. 1.
Figure 7A:
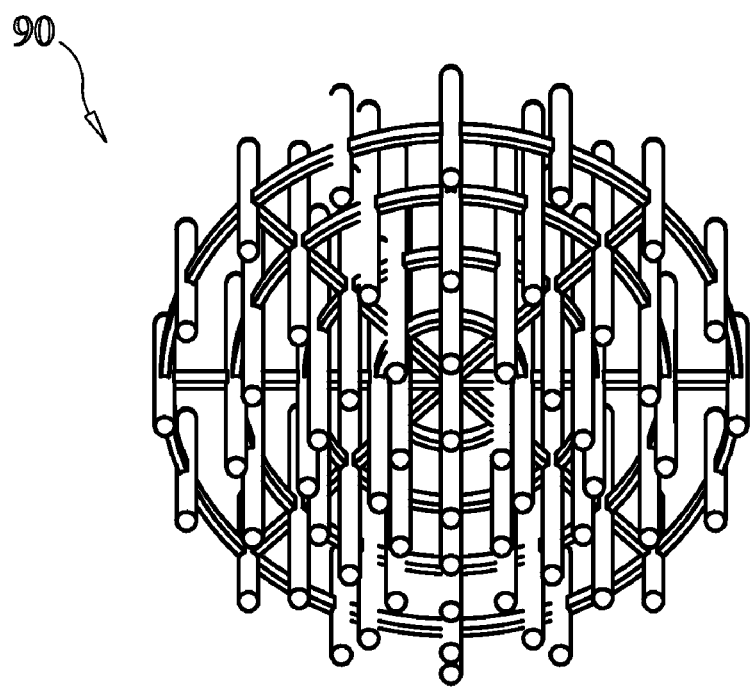
FIGS. 7*a* and 7*b* are different views of one embodiment of the biological filtering component preferably used with the present invention filtering system.
Figure 7B:
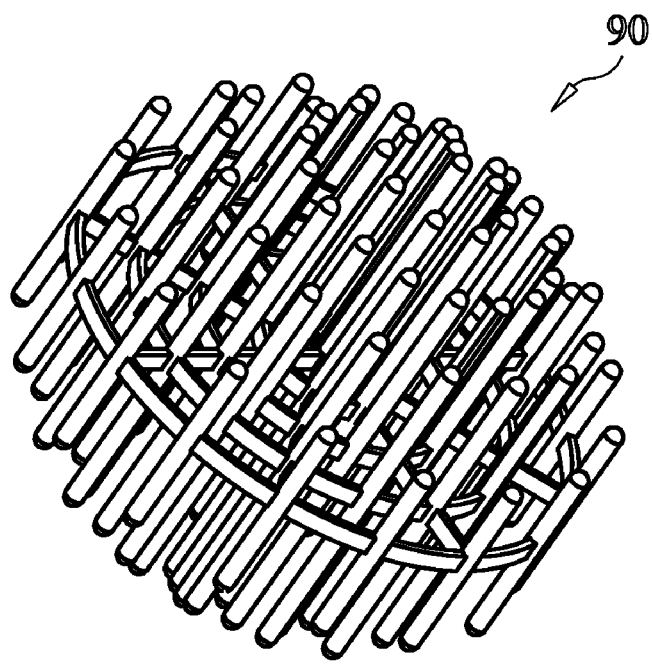
Figure 8:
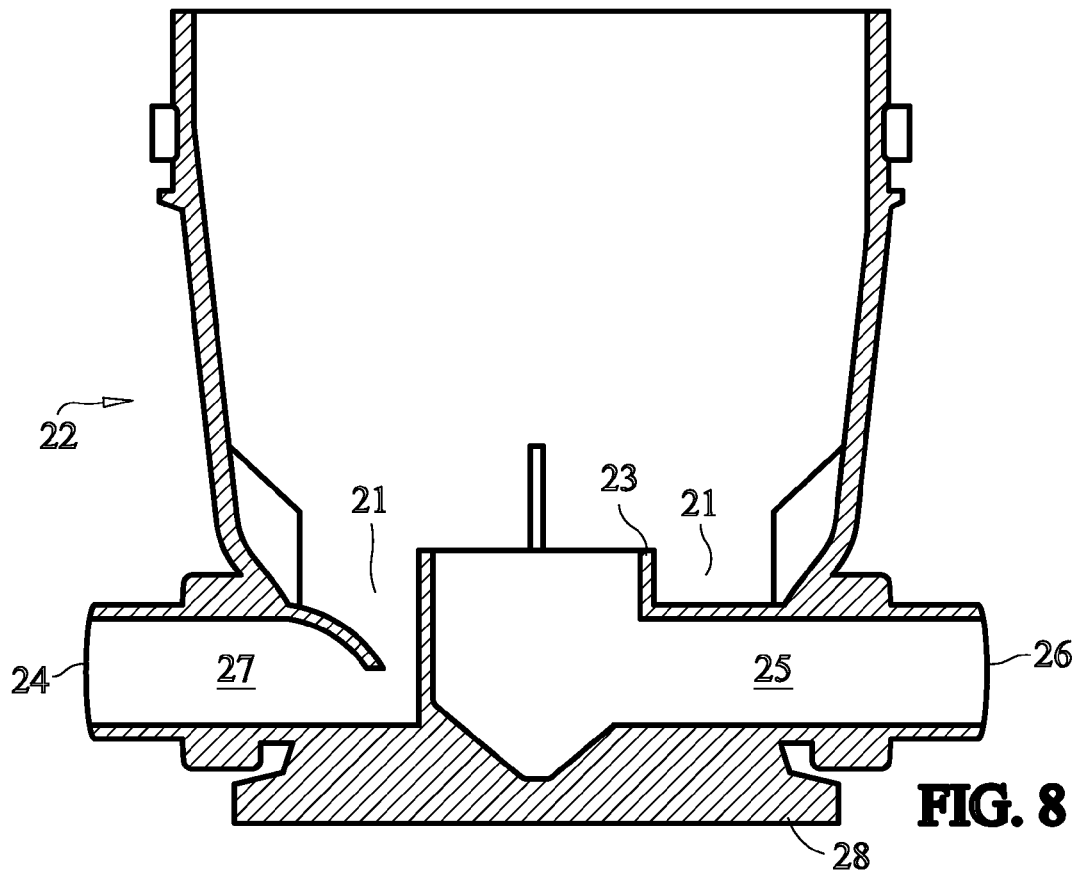
FIGS. 8 and 9 illustrate two internal views of one embodiment for the bottom portion of the housing with the filtering element removed.
Figure 9:
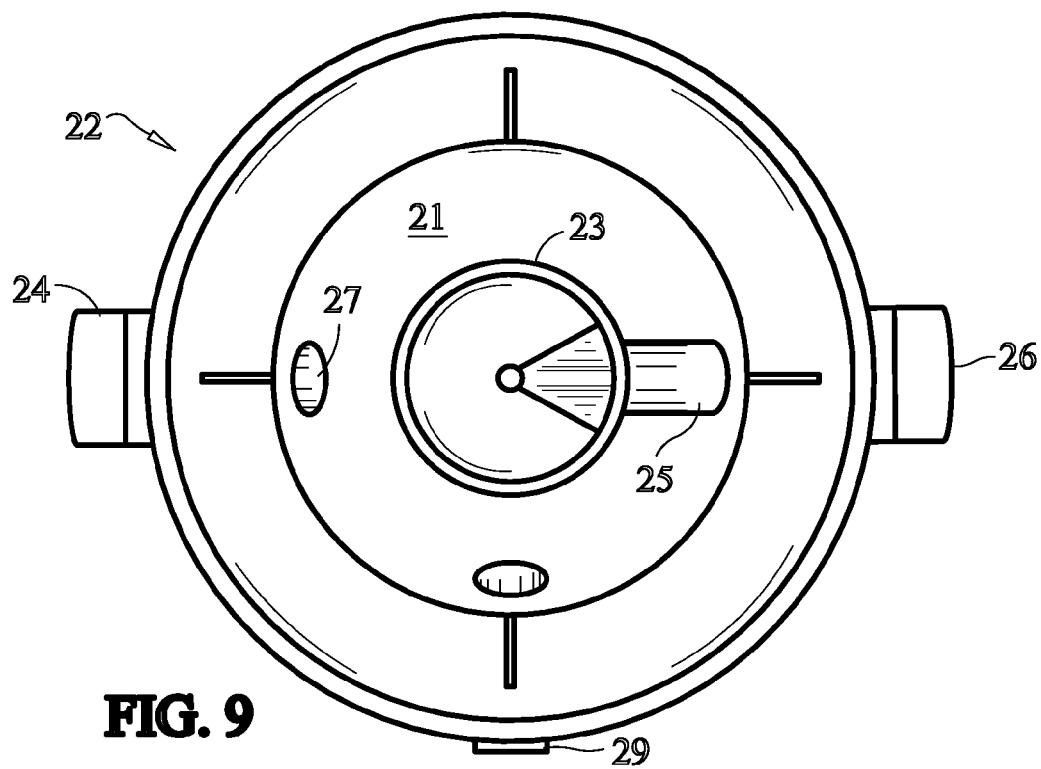

In the preferred embodiment, the biological filtering component can be biological beads or balls 90. (See FIG. 7), though other biological filters can be used and are considered within the scope of the invention. FIG. 4 shows the biological balls 90 disposed within an internal area 70 of the top portion 62 of center core 60.

Housing 20 includes a bottom portion 22 having an inlet 24 and an outlet 26 and can also be provided with a base 28. Although not shown, a drain cap assembly can also be provided within the bottom portion 22. Inlet 24 serves as the inlet for the unfiltered water from a pond or other fluid system or fluid area. Outlet 26 serves as the outlet for the fluid or water after it has been filtered in accordance with the present invention. Housing 20 includes an internal water entry area 21 that surrounds an upward extending center portion 23. Bottom portion 64 of center core 60 mates with the hollow center portion 23 of housing 23 when properly disposed which together form the internal storage area for the biological balls 90 or other biological filtering component. Inlet 24 is in communication with internal water entry area 21 through port or passageway 27, while outlet 26 is in communication with the internal area of center portion 23 through water passageway 25 disposed at the bottom of housing 20. Thus, water entering into housing, preferably under high pressure enters into internal water entry area 21 and is forced through the mechanical filtering component 80 and into internal area 70 of center core 60 where it contacts the biological filtering components and exits through the opening in center portion 23 through passageway 25 to housing outlet 26 and back to the pond or other water structure associated with filter system 10.

Housing 20 can also include a top portion 30 which is properly sealed to bottom portion 22, when housing 20 is in a closed configuration or position. The sealing of bottom portion 22 with top portion 30 can be accomplished by any conventional member, such as but not limited to, by a gasket or o-ring. Top portion 30 can be locked to bottom portion 22 by a locking ring 32 or any other fastening mechanism. Top portion 30 can also be provided with an air release valve 34 and a pressure gauge 36.

Figure 5:
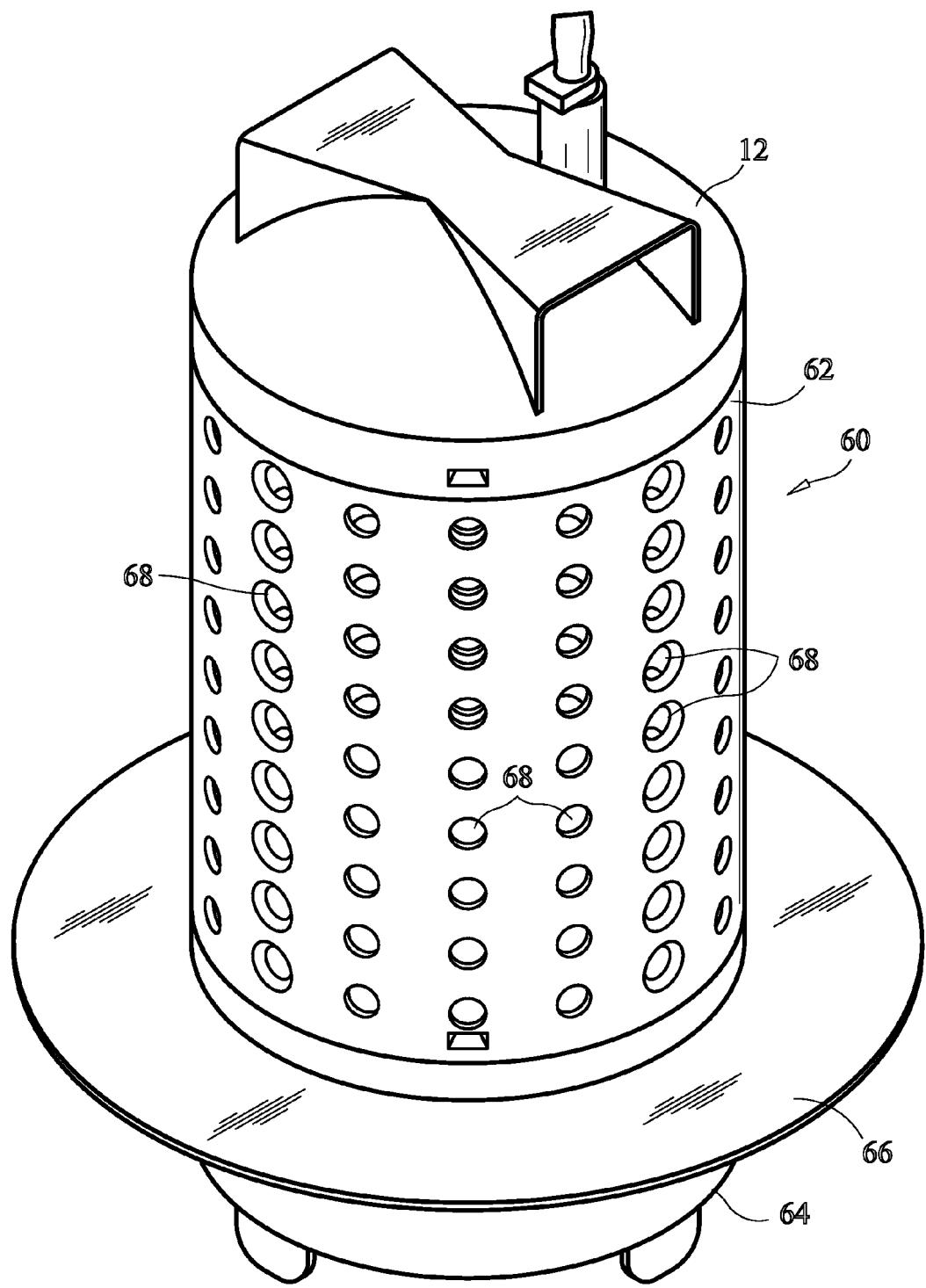
FIG. 5 is a perspective view of the filter core of FIG. 3.
Figure 6:
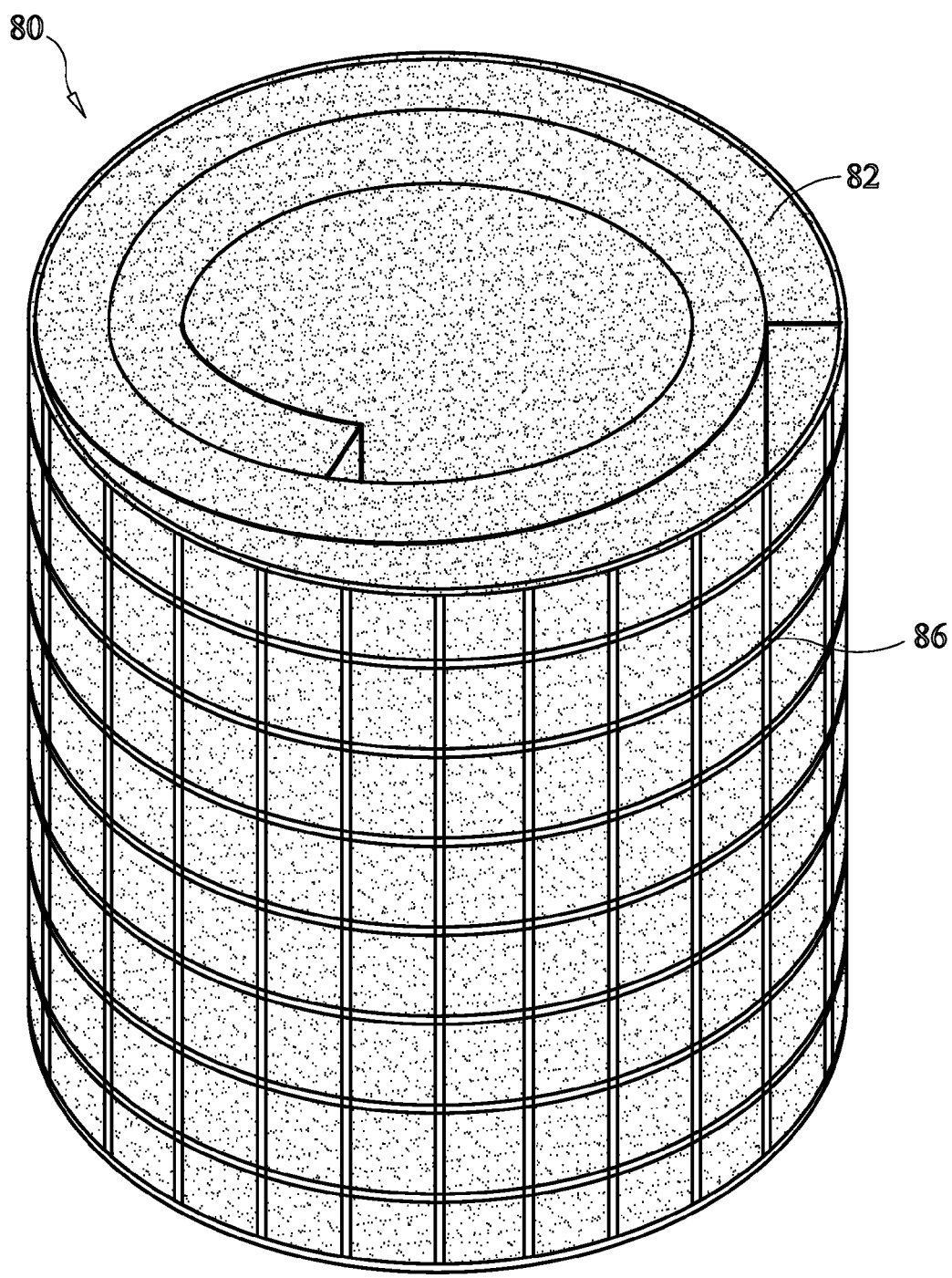
FIG. 6 is a perspective view of one embodiment for the mechanical filtering component in accordance with the present invention.

As best seen in FIG. 5, center core 60 consist of a top portion 62 having a plurality of apertures 68 which provide fluid access to the internal area 70 of core 60 which can be defined by top portion 62. Core 60 can also include a base portion 64 and a flange 66, which can be preferably circular or another shape to correspond to the shape of bottom center portion 23 of housing 20. A lid 72 can also be provided and secured to the upper end of top portion 62. As seen in FIG. 4, biological components 90 are disposed within the internal area 70 and internal hollow area within center portion 23.

A mechanical filter 80 such as padding 82 is preferably disposed around top portion 62 of center core 60 and preferably covers apertures 68. Padding 82 can be retained around center core top portion 62 through a fencing 83 or other retaining mechanism. Preferably, the bottom end of padding 82 rests upon flange 66 of center core 60 and can be further supported by flange 66. Center core 60, along with secured padding 82 and biological components 90, can be disposed within housing 20.

In lieu of fencing 83, one non-limiting example of an alternative pad retaining mechanism that can be used with the present invention is one or more retaining bands positioned and disposed around the perimeter of padding 82. The bands can be made of any suitable materials, and in one non-limiting embodiment, the band(s) can be constructed from an elastic material such that they fit snugly around padding 82 and their position around padding 82 is maintained. Belts (with or without a buckle mechanism), straps, ropes, cords, cables, etc. can also be used and are also considered within the scope of the invention. Though not preferred, a diameter adjustment or adjuster mechanism can also be provided to adjust the diameter of the band, strap, belt, rope, cord, cable, etc. and is also considered within the scope of the invention. The dimensions of the band, etc. are not considered limited to any specific size or dimension and all are considered within the scope of the invention. In one non-limiting example, the vertical length of the band, etc. (top end to bottom end) can be approximately ⅛" to approximately 1" in length, and further can be approximately ¼" in length, though such is not considered limiting.

In use for conditioning and filtering the water, water entering into housing 22 from inlet 24 first contacts mechanical filtering pad 82. As padding 82 preferably covers all of the apertures 68, the water entering from inlet 24 must travel through pad 82 in order to enter internal area 70 through aperture 68. Thus, prior to the water being allowed to enter internal area 70 and contact the biological filters 90, the water has been processed and cleaned through mechanical filter 80. Mechanical filter 80 can remove allergy and other contaminants, such that the filtered elements do not enter internal area 70 with the water and thus are not disposed onto the biological filters 90 disposed within internal area 70 and within center portion 23.

Accordingly, as the biological filters 90 do not get contaminated with these filtered elements, its reliability as a biological filter is maintained for an extended period time, if not an indefinite period of time. Additionally, as biological elements 90 remain basically clean of the filtered components, they do not need to be cleaned as frequently, if ever, as compared to conventional filtering systems.

The uncontaminated biological balls 90 provide a large amount of surface area for the growth of bacteria for filtration. This bacteria is important and beneficial for filtering the water in allowance for the processing of harmful organic materials. The geometric design of the biological balls 90 provide for an increasing surface area to cultivate more beneficial bacteria. The filtering of the water through mechanical filter 80 provides for maximum use of the surface area of the biological balls 90 for their intended purposes of fostering beneficial bacteria growth. The biological filtration provided through the biological balls 90 provide a natural action of bacterial breaking down dangerous amonious, converted to nitrate and then converting the nitrate to less toxic nitrate. In addition to the illustrated biological balls, other biological media and components can be disposed within the internal area 70 of center core 60 and within center portion 23 as the biological component 90, with or without one or more biological balls and used for similar purposes. These other biological components are also considered within the scope of the invention. The two stages of filtered (mechanical and then biological) water exits through the opening in center portion 23 through enclosed fluid passageway 25 and ultimately through housing outlet 26.

Thus, during use of the present invention filter, biological balls 90 are disposed within internal area 70 of core 60. The water forced through housing 20 (i.e., pressurized water) brings nutrients and oxygen required by the beneficial bacteria housed on the biological balls which complete the nitrogen cycle, with other non-essential particles and elements filtered by mechanical filter 80 prior to reaching biological balls 90. This results in a longer life and less required maintenance for biological balls 90.

Accordingly the present invention provides a filtering system 10, which contains the benefits of mechanical and biological filtering components into a single filtering system and such that the mechanical filter is contacted first by the entered water to filter out various types of particles from the water before the water contacts the biological filter.

The present invention can be used as a pre-filter (additional filter) installed in line after the pump on the discharge side of the filtration system and can be positioned before a conventional biological filter or bead filter. In this position, the pre-filter of the present invention catches the large particulates in the water so that the biological filter is kept clean. Alternatively, the present invention system can be used as a complete mechanical and biological filter system.

The present invention system filters the pond water in all three ways with one apparatus. The filter can remove virtually all, if not all, particulate and algae born material from the water running through the filter. Then the dirt free water passes through the biological material that removes virtually all, if not all, toxins produced by the fish in the pond. Thus, the output from the filter is crystal clean water, without the use of any chemicals, bacteria or ultraviolet light.

The present invention provides a filtration system incorporating a mechanical pressurized filter for filtering out algae normally associated with turning pond water brown or green. The present invention system can create clear water without any added chemicals or bacteria or with any ultraviolet light.

The following non-limiting definitions are provided to aid in understanding the concepts of the present invention discussed above:

(a) pump—the piece of equipment that moves water;

(b) submersible pump—a pump that is actually submerged under the water, (c) filter—the piece of equipment that water is pushed through that removes dirt;

(d) pressurized filter—a filter that is a closed unit that can be installed at any position after the pump;

(e) non-pressurized filter—a filter that is gravity fed and installed above grade of the pond;

(f) ultraviolet light—a cylindrical tube that water is pushed through that has a bulb inside;

(g) mechanical filtration—the removal of particulate; and biological filtration—the removal of toxins produced by fish waste.

It should also be recognized that the core having the internal area for housing the biological filtering element does not have to be centrally located within respect to the housing. Thus, as opposes to a core a wall having a plurality of apertures could be disposed within the housing. The internally disposed wall and a portion of the exterior side wall of the housing could define the internal area where the biological elements are disposed and the housing outlet could be in communication directly or indirectly with the internal area. Though not wrapped around, a mechanical padding or filter could be disposed over the wall and apertures. In this embodiment, the biological filter would be off center and be located along a portion of the side of the inner housing area. Other configurations could also be used and all are considered within the scope of the invention.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A fluid filtering system, comprising:
   a housing having a fluid inlet and a fluid outlet;
   a center core having a body member, said body member defining an internal area and having a plurality of apertures for providing fluid access to said internal area, said center core disposed within said housing;
   a biological filtering element disposed within said internal area of said center core; and
   a mechanical filtering element disposed around said center core and over said plurality of apertures;
   wherein fluid entering said housing through said fluid inlet is directed through said mechanical filtering element before entering the internal area of said center core through one or more of the plurality of apertures for contact with the biological filtering element prior to exiting the center core and then exiting said housing through said fluid outlet;
   wherein said biological filtering element are one or more biological balls disposed within said internal area, said biological balls provided with surface area for the buildup of beneficial bacteria(s).

2. The fluid filtering system of claim 1 wherein said mechanical filtering element is a padding wrapped around said center core and over said plurality of apertures.

3. The fluid filtering system of claim 2 further comprising means for retaining said padding around said center core and over said plurality of apertures.

4. The fluid filtering system of claim 1 wherein said one or more biological balls are a plurality of biological balls.

5. A method for filtering system fluid, said method comprising the steps of:
   (a) directing a fluid into a housing through a housing inlet, said housing having a central core portion having an internal area where one or more biological balls are disposed, said central core portion having one or more apertures providing access to the internal area which are covered by a mechanical filtering component;
   (b) directing the fluid entering the housing through the mechanical filtering component and through the one or more apertures entry into the internal area for contact with the one or more biological balls; and
   (c) exiting the fluid contacting the one or more biological balls from the internal area and out of an outlet of said housing.

6. The method for filtering system fluid of claim 5 wherein said one or more biological balls are a plurality of biological balls.

7. A fluid filtering system, comprising:
   a housing having a fluid inlet and a fluid outlet;
   a center core having a body member, said body member defining an internal area and having a plurality of apertures for providing fluid access to said internal area, said center core disposed within said housing;
   a plurality of biological balls disposed within said internal area of said center core; and
   a mechanical filtering padding disposed around said center core and over said plurality of apertures;
   wherein fluid entering said housing through said fluid inlet is directed through said padding element before entering the internal area of said center core through one or more of the plurality of apertures for contact with the biological balls to exiting the center core and then exiting said housing through said fluid outlet.

8. The fluid filtering system of claim 7 further comprising means for retaining said padding around said center core and over said plurality of apertures.

* * * * *